Patented Apr. 30, 1935

1,999,573

UNITED STATES PATENT OFFICE 1,999,573

SPECIAL CARBON BLACK

William W. Odell, Chicago, Ill.

No Drawing. Application August 29, 1930,
Serial No. 478,781

19 Claims. (Cl. 134—60)

My invention relates to a special carbon black that is catalytically active and which is particularly useful in rubber compositions, made from a gaseous compound containing combined carbon and differing from other carbons, so far as I am aware, by having condensed or adsorbed on its surface a metal oxide, such as zinc oxide.

At the present time carbon black is being manufactured by a number of different processes, such as by the partial combustion of hydrocarbons and the thermal decomposition of hydrocarbons with or without the use of some air, steam or both. It is common knowledge that carbons thus made have properties varying according to the conditions of production; they are black to gray in color, flocculent or dispersed and contain varying amounts of volatile matter, ash, and matter extractable by a solvent. The apparent specific gravity as well as the true specific gravity of these carbons also is a variable dependent upon the control of numerous operating details. The flocculent carbons or those whose particles do not readily disperse in fluid or plastic mediums find more limited use than the readily dispersed variety which are used in large quantities in the rubber industry. It is used in that industry not only as a filler but to improve the aging qualities, toughen and give greater coherence to the rubber. Other purposes for incorporating carbon in rubber compositions are discussed in the chemical literature on the subject; it is important to note that although the addition of carbon tends to prevent the rubber from tearing in use, the addition of an excess of carbon causes the rubber to chip. The latter is particularly noticeable in automobile-tire casings. Some carbons are suitable for use chiefly in the treads, having the property of stiffening the rubber to such an extent that it can not be used to the desired extent in the tire walls or inner tubes. A relatively high value has been assigned to that kind of carbon made by the incomplete combustion of a hydrocarbon gas, that is, by the drum, channel or disk process or the equivalent. Such carbon is fluffy, having a very low apparent specific gravity, and is incorporated in plastic masses with some difficulty and the consumption of an appreciable amount of time.

I find that it is possible to make a carbon having many of the properties of the carbons now highly rated in industry but which is more readily miscible with various plastic masses, that is, for example, one that can be incorporated in rubber mixtures in less time than the carbons made by incomplete combustion of hydrocarbons, and which can be used therein in larger percentage amounts than the latter. This result I attain by producing a carbon which has contacted a metal vapor at elevated temperatures and which retains some of the metal thus contacted adsorbed on its surface.

My experiments lead me to believe that the electric charge on the microscopic and ultra-microscopic particles has considerable to do with diffusion and with rate at which carbon can be incorporated in a plastic or fluid mass. Specific gravity is not the determining factor as many seem to believe. Carbon-containing adsorbed metal, metal oxide, carbonate or hydrate or combinations of them behave, when added to a plastic mass, in a manner different from that of the same carbon without the adsorbed material. There usually is less adsorbed air or other gas on the particles of carbon when they have contacted a metal vapor and adsorbed some of said metal. It is not entirely clear why this should be the case unless agglomeration occurs. As far as I can determine the amount of agglomeration is small unless it be among particles so small that they can not readily be detected by the microscope.

The oil absorption qualities of carbon having adsorbed or condensed materials on its surface is different from that of the ordinary carbon black. Other factors remaining the same the adsorption of a metal or metal oxide or both on the surface of a carbon black reduces the oil-absorption number. The amount of reduction can be controlled by merely controlling the amount of adsorbed metal per unit quantity of carbon. The kind of metal employed also has some bearing on the matter. The relative effect of substituting one metal or oxide for another is not the same, with respect to oil absorption, for all oils. In producing a carbon to be incorporated in rubber or in a rubber mixture, I find that zinc, zinc oxide, or both, are superior to certain other metals and their oxides, for example lead. For certain uses in rubber compositions antimony and its oxide are satisfactory. The preferred metal is chosen according to the catalytic effect desired, as well as according to the relative costs and ease of utilizing the various metals.

Reference has been made to the use of adsorbed metals, with the full realization that when exposed to the action of an oxidizing agent such as air most metals form oxides. For some uses it is preferred to produce a carbon having metal, with very little oxide adsorbed thereon. This product is inflammable whereas the carbon containing adsorbed oxides is not readily spontaneously ignited. The carbon containing adsorbed metal is ideal for use in making certain metal paints having as an oil base a "drying oil." For use in certain other paints the preferred carbon is the one containing adsorbed metal oxide. Likewise, for use in filtration, clarification, and in catalyzing chemical reactions the one or the other is preferred according to the effect desired. Another use of the product is in the briquetted form as a solid contact material.

In my patent application Serial No. 414,710 filed Dec. 17, 1929, and in my application Serial No. 430,100 filed February 20, 1930, Patent No. 1,964,744, I have described one method of making carbon black that is particularly well adapted for use in rubber compositions. This application is confined to a special carbon black and the method of producing it; the special black comprising particles the nuclei of which are particles of carbon black, and an outer portion comprising adsorbed non-carbonaceous matter. Broadly the product comprises a carbon black having a predetermined amount of mineral matter adsorbed on the surface of its particles. The mineral matter may comprise a metal or an oxidation product of a metal; said oxidation product need not necessarily be an oxide or contain oxygen.

Carbon has the peculiar property of absorbing sulphur gases or vapors and forming sulphur-carbon compounds with them. The amount of such absorption that will occur depends, among other variables, upon the concentration of the sulphur atmosphere and the temperature at which the carbon is exposed to the sulphur fumes. Believing that I have discovered broadly a new and useful material which may have a varying composition but which comprises chiefly, by volume, finely divided carbon, preferably made from a gas containing combined carbon, I prefer not to limit myself to the carbon containing metals or oxides adsorbed thereon. Sulphur, selenium, selenium chloride, selenium oxychloride, antimony chloride, sulphur chlorides or oxychlorides and many other volatile materials including salts may be employed in a similar manner. Certain organic products are similarly useful adsorbed on carbon.

I prefer to produce my special carbon black by causing the adsorption of the mineral matter to occur either at the time the carbon is formed (liberated from combination with another element such as hydrogen or oxygen) or immediately thereafter. The vapor of the mineral product is introduced in predetermined proportional amounts into a stream containing the carbon particles; or the stream in which carbon black is evolved is passed into contact with a bed of solids in which a mineral material is introduced for the purpose of producing a carbon containing adsorbed mineral matter, as described in my patent applications referred to above. In the latter method, if zinc oxide is used in a fuel bed through which the stream passes, some of the zinc oxide is reduced to metal and vaporized, and the vapors are adsorbed on the carbon particles. The metal thus adsorbed is readily oxidized on exposure to an oxidizing agent.

Various methods of bringing the carbon and mineral matter together can be conceived; the process, which I believe to be new, comprises, causing a mineral material or a product therefrom to be condensed on a carbon black. The step comprising, controlling the relative amount of matter thus condensed by regulating the supply of said material to the stream containing the carbon, is also considered to be new. The mineral matter, its vapor or a reduction product therefrom is caused to contact the carbon black at temperatures below the decomposition point of the material to be adsorbed.

The product, which I believe to be a new composition of matter, has properties that are obviously different from catalyst made by precipitating a metal on an ordinary, solid, carbonaceous material such as charcoal. For example the latter are not suitable for use in paints or in rubber compositions. My product affords a means of supplying materials such as sulphur, zinc oxide, other metal oxides, metals, metal compound, arsenic, tellurium, selenium or other volatile matter that can be condensed on carbon black, in an extremely fine state of subdivision to mixtures in which they are involved in chemical or catalytic action or both. The finer the state of subdivision of a catalyst the greater the surface and the less of it by weight is required for a definite catalytic effect. I claim to obtain a large surface with a minimum amount of catalyst by causing said catalyst to be condensed on a carbon black. The layer or film obtained by adsorption of a vapor on particles of carbon black is obviously a substantially uniform layer and does not consist of deposits chiefly in the crevices of the carbon particles. In making rubber mixtures it is sometimes advantageous to use two or more different grades of carbon, such as, one containing adsorbed sulphur and one containing a metal compound such as zinc oxide. Because carbon black is cheaper than the metal compounds commonly used therewith in compounding rubber, a saving is made by substituting for a large part of said metal compound a carbon black having a metal compound adsorbed thereon.

The carbon basis of my "special carbon black" may be made by various reactions some of which are the following:

(1) $CH_4$ (thermal decomposition) $= C + 2H_2$
(2) $C_2H_6$ (thermal decomposition) $= 2C + 3H_2$
(3) $C_nH_{2n+2}$ (thermal decomposition) $= nC + (n+1)H_2$
(4) $C_2H_4$ (thermal decomposition) $= 2C + 2H_2$
(5) $C_nH_{2n}$ (thermal decomposition) $= nC + nH_2$
(6) $C_xH_{2y}$ (thermal decomposition) $= xC + yH_2$
(7) $2CO = CO_2 + C$ Equations (1) and (2) show the reactions typifying the dissociation of methane and ethane respectively as by contact with a heated mass of solid contact material, whereas Equation (3) is a generic equation for the paraffins. Equation (4) shows the effect of dissociating ethylene and Equation (5) is generic for olefins. Equation (6) is generic for miscellaneous hydrocarbons. Equation (7) shows the reaction for the incomplete oxidation of carbon monoxide accompanied by liberation of carbon which occurs at moderate temperatures, that is, at a lower temperature than that required for the complete dissociation of methane. This reaction occurs catalytically to a large extent at a temperature as low as 950° F., as disclosed in my Patent 1,964,744.

The carbons produced, by these reactions is a satisfactory base for adsorbing the vapors of such materials as referred to above and forms with them special carbons which I claim broadly to be new. It is recognized that the properties and usefulness of the different ordinary grades of carbon black, including lampblack vary over a wide range; it is also true that the special carbons, those having adsorbed liquids or solids on the surface of their particles, are different one from another not only according to the nature of the carbon used in its production but also according to the nature of the material adsorbed or condensed on the carbon particles. These various grades of special carbon have numerous particular uses. For example it is recognized that a carbon, having a material such as a metal salt condensed on its particles, that is adapted for use in mixed paints, the salt being a catalyst to the "drying" of said paint, is not so well adapted for use in a rubber composition suitable for making auto tires as one containing zinc or zinc oxide. Other examples can be given but it seems to be superfluous; I claim, and believe to be new the product comprising carbon, the particles of which are microscopic to ultra-microscopic in size having a catalyst condensed thereon. In the manner described, by the selection of a particular adsorbable material, the specific gravity, apparent density (weight per unit volume without compressing), color, activity, dispersion property, electric charge, electrical conductivity, surface wetting properties, oil absorption and other properties can be controlled. Much of the benefit derived from the use of my special carbon as a catalyst lies in the fineness in size of the carbon which in turn makes possible the exposure of a very large catalyst surface per unit quantity of catalytic material used in making said special carbon. The size of carbon particles usually preferred in producing my product, or rather the preferred size of the carbonaceous nucleus that is circumscribed by the adsorbed layer, is substantially microscopic, ultra-microscopic or a mixture comprising chiefly particles that are microscopic and smaller in size. The particles of ordinary lampblack (the commercial product) are relatively rather large, although for some purposes the special carbon made with a lampblack nucleus is satisfactory.

In making my product it is usually advantageous to cause adsorption to occur in the hot reducing atmosphere in which the carbon is evolved. When the carbon is made by the thermal decomposition of hydrocarbons the reducing atmosphere comprises hydrogen. When a metal oxide such as zinc oxide is blown into a stream of that gas laden with suspended carbon black, at a temperature above 1706° Fahrenheit it is not only reduced to the metal but the metal is in the vapor phase. At lower temperatures the amount of metal that can exist in the desired vapor phase depends on the temperature; at 788° Fahrenheit the vapor pressure of zinc is substantially zero, hence the concentration of zinc in the gaseous state is substantially zero. It is accordingly desirable in fact essential, when using zinc, to introduce it, or its oxide, into the fluid stream containing the suspended carbon when the temperature of said steam is higher than 788° Fahrenheit; it is preferable to introduce the zinc or a compound of it when the stream is at a temperature above about 1300° to 1450° Fahrenheit. Selenium, on the other hand, boils at 1274° Fahrenheit and therefore it can be introduced when the stream is at a temperature lower than 1274° Fahrenheit. The minimum temperature in any case is that corresponding to the minimum vapor pressure that will produce a partial pressure of the added vapor to yield the adsorption effect desired; it is usually somewhat below the boiling point of the material to be adsorbed. There is no particular maximum temperature except with compounds that decompose, and in such cases the decomposition temperature is the upper limit. It is of course recognized that the vapors of most materials are not adsorbed by carbon at temperatures greatly above their boiling points, but because the gas stream is subsequently cooled in the recovery of the finished product, adsorption will occur even though the materials are introduced, or heated during processing, to a temperature higher than necessary. In general I prefer to cause the freshly evolved carbon to contact the chosen material to be adsorbed at a temperature close to (above, at or below) the boiling-point temperature of said material. It is sometimes preferable to cause the carbon to be evolved in an atmosphere containing the vapor of the material to be absorbed; this cannot readily be done with materials that decompose at a temperature below that at which carbon is evolved from the carbon-containing compound but is particularly advantageous with the metals and their oxides.

Having described my invention so that one skilled in the art can practice it, I claim:

1. A special carbon black of thermal production presenting the distinguishing characteristics that its particles of microscopic size are nuclei of substantially pure carbon having adsorbed on their outer surfaces as a thin substantially uniform film the condensed vapor of a solid catalyst, said catalyst being adapted to function catalytically in the compounding of rubber when incorporated therein.

2. A special carbon black of thermal production presenting the distinguishing characteristics that its particles of microscopic size are nuclei of carbon having adsorbed in a substantially uniform and thin layer on their surfaces the vapor of a rubber-compounding catalyst which is resistant to thermal decomposition at temperatures of the order of 788° F., said catalyst being adapted to function catalytically in the compounding of rubber when incorporated therein.

3. A special carbon black thermally produced from a gas containing combined carbon, the particles of which are microscopic to ultra-microscopic in size having condensed on their outer surfaces only, the vapor of zinc and zinc oxide.

4. A carbon black pigment adapted for rubber-compounding comprising adsorbed vapors of a metal oxide selected from the group consisting of zinc, antimony and selenium oxides condensed in a substantially uniform and thin layer on the outer surfaces of carbon nuclei.

5. A carbon black pigment adapted for rubber compounding comprising particles having substantially pure carbon nuclei of microscopic size having the vapor of a solid catalyst adsorbed on their outer surfaces in a substantially uniform thin layer, said catalyst comprising a material selected from the group consisting of, zinc, zinc oxide, selenium, selenium oxide, antimony and antimony oxide.

6. A special carbon black of thermal production presenting the distinguishing characteristics that its particles of microscopic size are nuclei of carbon having adsorbed on their outer surfaces the vapor of an adsorbable catalytic metal salt which is resistant to thermal decomposition at a temperature of the order of 788° F., as a substantially uniform thin film.

7. A special carbon black of thermal production presenting the distinguishing characteristics that its particles of microscopic size are nuclei of substantially pure carbon having adsorbed on their surfaces as a substantially uniform thin film, the vapor of a readily volatilizable, rubber-compounding, solid catalyst which is resistant to thermal decomposition at a temperature of the order of 788° to 1300° F.

8. A special carbon black readily miscible with and dispersed in a plastic mass, the particles of which are microscopic to ultra-microscopic in size, which particles have adsorbed thereon a superficial, thin substantially uniform coating of a rubber-compounding catalyst comprising a metal oxide selected from the group consisting of zinc, antimony and selenium oxides.

9. In the process of making carbon black by the liberation of carbon black from a stream of a fluid containing combined carbon, the steps, which comprise introducing zinc into said stream, and causing at least a portion of said zinc to be adsorbed by the particles of liberated carbon black.

10. A special carbon black of the class formed by thermal liberation from a carbon-containing gas, having the distinguishing characteristics that its particles of microscopic to ultra-microscopic size consisting essentially of nuclei of substantially pure carbon having the condensed vapors of a solid metalliferous catalyst adsorbed on and in direct contact with their outer surfaces, as a substantially thin film.

11. A special substantially pure carbon black having the distinguishing characteristics that its particles of microscopic to ultra-microscopic size as freshly generated from a gas have adsorbed on their outer surfaces only an extremely thin substantially uniform coating which coating, is the condensed vapor of a solid metalliferous catalyst adsorbable on carbon.

12. A special carbon black of thermal production being substantially a carbon thermally liberated from a carbon compound, the particles of which, being initially microscopic to ultra-microscopic in size, have condensed on their outer surfaces as a substantially uniform thin film, substantially at the time of their formation but before cooling, a rubber-compounding catalyst comprising zinc oxide.

13. A special carbon black, being a reduction product of a vaporous carbon compound, the particles of which are microscopic to ultra-microscopic in size comprising substantially pure carbon nuclei having condensed thereon from the vapor phase a rubber-compounding catalyst consisting essentially of zinc which catalyst is adsorbed on the outer surfaces of said nuclei substantially at the time of their formation, in a superficial substantially thin film.

14. In the process of making carbon black by the liberation of carbon from a stream of a fluid containing combined carbon, the steps, introducing into said stream the vapor of a catalyst of the group consisting of a catalytic metal, a catalytic metal salt adsorbable on carbon, and a catalytic metal oxide, which catalyst is resistant to heat decomposition at 788° to 1300° Fahrenheit, and causing said vapor to be adsorbed on the outer surfaces of the particles of freshly generated hot carbon as nuclei in a reducing atmosphere prior to their exposure to air.

15. The process of making a special carbon black from a combustible gas containing combined carbon, comprising, liberating at least a part of said combined carbon by contact with a heated surface, contacting the liberated carbon substantially as generated with the vapor of an adsorbable rubber-compounding catalytic material and causing it to adsorb said material.

16. The process of making a special carbon black from a combustible fluid containing combined carbon, comprising, passing a stream of said fluid substantially in the vapor phase into contact with a mass of solid contact material heated to a temperature sufficient to cause the liberation of at least a portion of said combined carbon from said fluid, introducing into said stream containing said liberated carbon a condensable adsorbable vapor of a rubber-compounding catalyst, and causing the adsorption of said vapor by said liberated carbon.

17. The process of making a special carbon black from a combustible gas containing combined carbon, comprising, liberating at least a part of said combined carbon as carbon black by contacting said gas with a heated surface at a temperature above 950° F., contacting the freshly generated carbon-black with the vapor of a rubber-compounding catalyst, and causing the adsorption of said catalyst by the particles of said carbon black.

18. The process of making a special carbon black from a combustible gas containing combined carbon, comprising, causing a stream of said gas to contact a heated refractory material at a temperature of at least 950° F. thereby liberating at least a part of said combined carbon as carbon black entrained in said stream, introducing into said stream the vapor of an adsorbable rubber-compounding catalyst, and causing the particles of said carbon black to adsorb said catalyst.

19. The process of making a special carbon black from a combustible gas containing combined carbon, comprising, causing a stream of said gas to contact a heated refractory material at a temperature of at least 950° F. thereby liberating at least a part of said carbon as carbon black entrained in said stream, introducing into said stream the vapor of an adsorbable rubber-compounding catalyst at a temperature above 788° F., and causing the adsorption of said catalyst by the particles of said carbon black substantially at the time said particles are formed.

WILLIAM W. ODELL.